United States Patent [19]

Schlak et al.

[11] Patent Number: 5,112,874
[45] Date of Patent: May 12, 1992

[54] MOLDED POLYURETHANE PLASTICS, A PROCESS FOR THEIR PRODUCTION AND THEIR USE AS SHOE SOLES

[75] Inventors: Ottfried Schlak, Cologne; Dieter Wecker, Krefeld, both of Fed. Rep. of Germany

[73] Assignee: Bayer Aktiengesellschaft, Leverkusen, Fed. Rep. of Germany

[21] Appl. No.: 398,038

[22] Filed: Aug. 24, 1989

[30] Foreign Application Priority Data

Sep. 1, 1988 [DE] Fed. Rep. of Germany ....... 3829583

[51] Int. Cl.⁵ .................. C08L 83/06; C08K 5/54
[52] U.S. Cl. .................. 521/51; 521/50; 521/155; 528/21; 528/27; 528/28; 528/906
[58] Field of Search .................. 521/50, 51, 155; 528/27, 28, 21, 906

[56] References Cited

U.S. PATENT DOCUMENTS

| | | | |
|---|---|---|---|
| 3,246,048 | 4/1966 | Haluska | 528/27 |
| 3,726,952 | 4/1973 | Boden et al. | 264/48 |
| 4,024,090 | 5/1977 | von Bonin et al. | 521/51 |
| 4,033,912 | 7/1977 | Kleimann et al. | 528/21 |
| 4,057,595 | 11/1977 | Rauner et al. | 528/906 |
| 4,058,492 | 11/1977 | von Bonin et al. | 521/51 |
| 4,065,410 | 12/1977 | Schäfer et al. | 521/51 |
| 4,098,731 | 7/1978 | von Bonin et al. | 521/51 |
| 4,218,543 | 8/1980 | Weber et al. | 521/51 |
| 4,296,212 | 10/1981 | Ewen et al. | 521/163 |
| 4,298,701 | 11/1981 | Meyborg et al. | 521/51 |
| 4,590,224 | 5/1986 | Frisch | 521/155 |
| 4,647,643 | 3/1987 | Zdrahala et al. | 528/28 |

FOREIGN PATENT DOCUMENTS 1218190  2/1987  Canada.
1365215  8/1974  United Kingdom.

*Primary Examiner*—John Kight, III
*Assistant Examiner*—Duc Truong
*Attorney, Agent, or Firm*—Joseph C. Gil; Thomas W. Roy

[57] ABSTRACT

The present invention is directed to optionally cellular, molded polyurethane plastics having a solid surface and characterized by a content of about 0.1 to 8.0% by weight, based on the weight of the polyurethane plastic, of a polysiloxane which is chemically incorporated into the polyurethane structure.

The present invention is also directed to a process for the production of these molded plastics by reacting in closed molds a reaction mixture containing
a) a polyisocyanate component,
b) a component containing at least one organic compound having at least two isocyanate-reactive groups and a molecular weight of 400 to about 20,000 and
c) optionally a compound having at least two isocyanate-reactive groups and a molecular weight of 18 to 399, wherein a portion of component b) and/or c) contains at least one polysiloxane containing at least two isocyanate-reactive groups in an amount of about 0.1 to 8.0% by weight, based on the weight of the polyurethane plastic.

Finally, the present invention is directed to the use of these polyurethane plastics shoe soles.

3 Claims, No Drawings

MOLDED POLYURETHANE PLASTICS, A PROCESS FOR THEIR PRODUCTION AND THEIR USE AS SHOE SOLES

BACKGROUND OF THE INVENTION

1. Field of the Invention

This invention relates to molded plastics having improved abrasion resistance based on polyurethanes containing chemically incorporated polysiloxanes, to a process for their production and to their use as shoe soles.

2. Description of the Prior Art

Optionally cellular molded plastics based on polyurethanes and having a solid surface and their preparation are known (cf., for example, U.S. Pat. No. 4,065,410, U.S. Pat. No. 4,218,543, U.S. Pat. No. 3,726,952, British Pat. 1,365,215, U.S. Pat. No. 4,033,912, U.S. Pat. No. 4,024,090, U.S. Pat. No. 4,058,492, U.S. Pat. No. 4,098,731, EPA 17,928, EPA 44,481, EPA 69,286 and DE-OS 3,133,859). In this regard, "molded polyurethane" plastics include not only pure polyurethane plastics obtained by reacting organic polyisocyanates with organic polyhydroxyl compounds, but also plastics prepared by trimerizing a portion of the isocyanate groups to form isocyanurate groups and/or by reacting a portion of the isocyanate groups with co-reactants containing amino groups to form urea groups. These molded polyurethane plastics can be produced in soft, semi-hard and hard form. In particular, the elastomeric, optionally cellular "semi-hard" moldings based on polyurethanes have been used for many years, inter alia, for the production of shoe soles. A disadvantage of these plastics, particularly those based on polyether polyols, is the very high wear. Thus, there is a demand to provide optionally cellular molded polyurethane plastics with a solid outer skin, in particular a semi-hard elastomer, which are useful as shoe soles and do not have the disadvantage mentioned.

Accordingly, an object of the present invention was to develop new polyurethane moldings which satisfy the demand for reduced wear without having an adverse affect on the other desirable properties.

This object has been achieved in accordance with the polyurethane moldings according to the invention as described hereinafter.

SUMMARY OF THE INVENTION

The present invention is directed to optionally cellular, molded polyurethane plastics having a solid surface and characterized by a content of about 0.1 to 8.0% by weight, based on the weight of the polyurethane plastic, of a polysiloxane which is chemically incorporated into the polyurethane structure.

The present invention is also directed to a process for the production of these molded plastics by reacting in closed molds a reaction mixture containing
a) a polyisocyanate component,
b) a component containing at least one organic compound having at least two isocyanate-reactive groups and a molecular weight of 400 to about 20,000 and
c) optionally a compound having at least two isocyanate-reactive groups and a molecular weight of 18 to 399, wherein a portion of component b) and/or c) contains at least one polysiloxane containing at least two isocyanate-reactive groups in an amount of about 0.1 to 8.0% by weight, based on the weight of the polyurethane plastic.

Finally, the present invention is directed to the use of these polyurethane plastics shoe soles.

DETAILED DESCRIPTION OF THE INVENTION

Starting component a) for the process according to the invention include any organic polyisocyanates such as those disclosed in German Pat. 2,404,310, column 3, line 39 to column 4, line 56 (U.S. Pat. No. 4,058,492, herein incorporated by reference). Organic polyisocyanates exclusively containing aromatically bound isocyanate groups and have an average NCO functionality of 2 to 2.3 are preferably employed in the process according to the invention. The particularly preferred polyisocyanates include polyisocyanates or polyisocyanate mixtures which are liquid at room temperature and members of the diphenylmethane series, i.e. mixtures of 4,4'-diisocyanatodiphenylmethane with 2,4'-diisocyanatodiphenylmethane; carbodiimide- or uretoneimine-modified derivatives of either of these diisocyanates or their mixtures, in particular those of the type described in DE-OS 2,624,526; and products prepared by the reaction of 1 mole of 4,4'-diisocyanatodiphenylmethane with about 0.05 to 0.3 moles of one or more low molecular weight diols or triols, preferably polypropylene glycols having a molecular weight of up to 700, as described, for example, in DE-OS 1,618,380.

It is also possible to employ NCO semi-prepolymers based on 4,4'-diisocyanatodiphenylmethane or the previously mentioned particularly preferred polyisocyanates and polyhydroxyl compounds of the type set forth below as examples for component b) as starting materials a) in the process according to the invention. In this connection, "NCO semi-prepolymers" are reaction products of the individual components previously set forth at an NCO:OH equivalent ratio of about 2.2:1 to 20:1, preferably about 3:1 to 10:1.

Starting component b) is at least one compound containing at least two isocyanate-reactive groups and having an average molecular weight, which can be calculated from the functionality and the content of isocyanate-reactive groups (which are determined by titration and referred to as the hydroxyl or amine number), of 400 to about 20,000, preferably about 1000 to 7000 and more preferably about 2000 to 6000.

Starting component b) is preferably a di- and/or trifunctional polyether polyols. These polyether polyols may be prepared in a known manner, for example, by polymerization of epoxides such as ethylene oxide, propylene oxide, butylene oxide, tetrahydrofuran, styrene oxide or epichlorohydrin either individually or as mixtures, for example in the presence of Lewis catalysts such as $BF_3$, or by the addition of these epoxides, preferably ethylene oxide and propylene oxide, either in admixture or successively, onto starting components containing reactive hydrogen atoms such as water, alcohols, ammonia or amines. Examples of these starter components include ethylene glycol, 1,3- or 1,2-propylene glycol, trimethylolpropane, glycerol, sorbitol, 4,4'-dihydroxydiphenylpropane, aniline, ethanolamine or ethylenediamine. Sucrose polyethers, as described, for example, in German Auslegeschriften 1,176,358 and 1,064,938, and polyethers initiated with formitol or formose (German Offenlegungsschriften 2,639,083 and 2,737,951) are also suitable according to the invention.

Preferred polyethers are those which predominantly contain primary OH groups (up to about 90% by weight, based on all the OH groups present in the polyether). Suitable starting components b) also include the so-called aminopolyethers or aminohydroxy-polyethers in the above-mentioned molecular weight range, in which at least 25, preferably at least 50 and more preferably 80 to 100 equivalent-% of the terminal isocyanate-reactive groups are primary and/or secondary, aromatically or aliphatically bound amino groups and the remainder are primary and/or secondary, aliphatically bound hydroxyl groups. In these compounds, the terminal radicals carrying the amino groups may also be linked to the polyether chain by urethane or ester groups.

These preparation procedures for these "aminopolyethers" are known. Thus, for example, the amination of polyhydroxypolyethers such as polypropylene glycol ethers can be carried out by reacting ammonia in the presence of Raney nickel and hydrogen (Belgian Pat. 634,741). U.S. Pat. No. 3,654,370 describes the preparation of polyoxyalkylene polyamines by reacting the appropriate polyol with ammonia and hydrogen in the presence of a nickel, copper or chromium catalyst. German Pat. 1,193,671 describes the preparation of polyethers containing amino end groups by the hydrogenation of cyanoethylated polyoxypropylene ethers. Further methods of preparing polyoxyalkylene polyether amines are described in U.S. Pat. No. 3,155,728, U.S. Pat. No. 3,236,895 and French Pat. 1,551,605. French Pat. 1,466,708 describes the preparation of polyethers containing secondary amino end groups.

High-molecular-weight polyhydroxypolyethers can be converted, by reaction with isatoic anhydride, into the corresponding anthranilic acid esters which are suitable for use as component b) as described, for example, in DE-OS 2,019,432, DE-OS 2,619,840, U.S. Pat. No. 3,808,250, U.S. Pat. No. 3,975,428 or U.S. Pat. No. 4,016,143. In accordance with these processes, polyethers containing terminal aromatic amino groups are produced.

By reacting NCO prepolymers based on polyhydroxypolyethers with hydroxyl group-containing enamines, aldimines or ketimines with subsequent hydrolysis, high molecular weight compounds containing terminal amino groups are obtained according to DE-OS 2,546,536 and U.S. Pat. No. 3,865,971.

It is possible to use other aminopolyethers in the above-mentioned molecular weight range such as those obtained, for example, in accordance with DE-OS 2,948,419, DE-OS 3,039,600 or U.S. Pat. No. 4,774,263 and 4,774,264 (both of which are herein incorporated by reference).

It is of course also possible to employ as starting component b) according to the invention, mixtures of the compounds containing isocyanate group-reactive groups previously mentioned.

The compounds which contain isocyanate-reactive groups and are suitable as starting component b) are not limited to the compounds mentioned above. Thus, the compounds containing isocyanate-reactive groups and preferably having a molecular weight 400 to 12,000 which are described in U.S. Pat. No. 4,218,543 (herein incorporated by reference) can be employed in the process according to the invention.

Starting component c) which may optionally be used include chain extenders or crosslinking agents having a molecular weight range 18 (water) or 32 (hydrazine) to 399 which contain at least two primary or secondary amino groups and/or hydroxyl groups. Difunctional compounds are preferably employed.

Examples of these compounds include hydrazine, ethylenediamine, hexamethylenediamine, 1-amino-3,3,5-trimethyl-5-aminomethyl-cyclohexane (IPDA), N,N'-dimethylhydrazine, ethylene glycol, 1,2- and 1,3-propylene glycol, 1,4-dihydroxybutane, 1,6-dihydroxyhexane, glycerol, trimethylolpropane, pentaerythritol, quinitol, mannitol, diethylene glycol, triethylene glycol, tetraethylene glycol, dipropylene glycol, tripropylene glycol, dibutylene glycol, diethanolamine, diisopropanolamine, 1,4-diaminobenzene, 2,4-diaminotoluene or 4,4'-diaminodiphenylmethane.

The preferred compounds to be employed in the process according to the invention as component c) are diprimary aromatic diamines which contain at least one alkyl substituent in an ortho-position to each amino group, in particular those which contain at least one alkyl substituent in an ortho-position to the first amino group and two alkyl substituents, each having 1 to 4, preferably 1 to 3, carbon atoms, in the ortho-positions to the second amino group. Particularly preferred those which contain an ethyl, n-propyl and/or isopropyl substituent in at least one ortho-position to each amino group and optionally contain methyl substituents in any other ortho-positions to the amino groups.

Examples of such preferred or particularly preferred diamines include 2,4-diaminomesitylene, 1,3,5-triethyl-2,4-diaminobenzene, 1-methyl-3,5-diethyl-2,4-diaminobenzene and/or 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenyl methane, 1-t-butyl-3,5-dimethyl-2,4-diaminobenzene and/or 1-t-butyl-3,5-dimethyl-2,6-diaminobenzene, or any mixtures of these diamines.

Additional preferred compounds which may be employed according to the invention as component c) are aliphatic diols having a molecular weight of 62 to 200 such as ethylene glycol, 1,2-dihydroxypropane and dihydroxybutane. It is of course also possible to employ any mixtures of alcohols and/or amines as synthesis component c). Synthesis component c) is used in the process according to the invention in an amount of 0 to about 50% by weight, preferably about 10 to 40% by weight, based on component b).

In accordance with the present invention, auxiliaries and additives d) may also optionally be used. Examples include:

1. Blowing agents such as acetone, ethylacetate and, in particular, halogen-substituted alkanes such as dichloromethane, trichloromethane, monofluorotrichloromethane, chlorodifluoromethane and dichlorodifluoromethane. The use of water is also possible, but less preferred.
2. Catalysts for the isocyanate polyaddition reaction as described, for example, in U.S. Pat. No. 4,065,410 (herein incorporated by reference) at column 5, line 59 to column 6, line 30.
3. Surface-active additives and other additives, as described, for example, in U.S. Pat. No. 4,065,410 (herein incorporated by reference) at column 6, line 34 to column 7, line 2.

Further examples of surface-active additives, foam stabilizers, flame retardants, plasticizers, colorants and fillers, fungistatically and bacteriostatically active substances which can optionally also be used according to the invention and details on the use and mode of action of these additives are described in Kunststoff-Handbuch [Plastics Handbook]. Volume VII, published by Vieweg and Hochtlen, Carl-Hansler-Verlag, Munich 1966, for example on pages 103 to 113.

try and Technology of Silicones]. 2nd Edition 1968, Verlag Chemie, Weinheim/Bergstrasse.

The following organofunctional polysiloxanes, for example, are suitable for the process according to the invention:

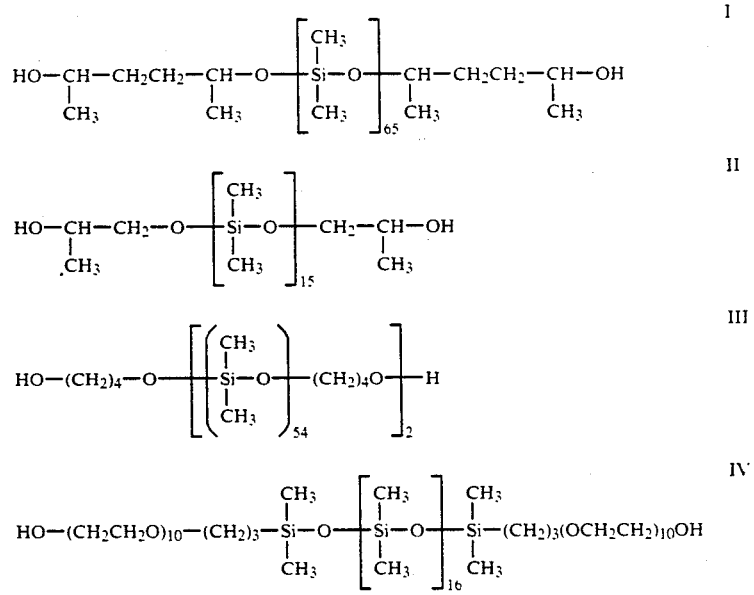

The use of polysiloxanes containing at least two isocyanate-reactive groups as at least a portion of component b) and/or c) is essential to the invention. The polysiloxanes are present in an amount of about 0.1 to 8.0% by weight, preferably about 0.5 to 4.0% by weight, based on the weight of the molded polyurethane plastic. Suitable polysiloxanes include essentially linear polysiloxanes corresponding to the formula

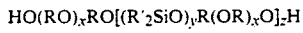

wherein
  x denotes an integer between 0 and 50
  y denotes an integer between 5 and 500,
  z denotes an integer between 1 and 10,
  R represents a straight chain or branched $C_2$–$C_{20}$-alkylene group and
  R' represents an optionally branched or substituted $C_1$–$C_{20}$-alkyl group or an optionally substituted aryl group, and polysiloxanes of the formula

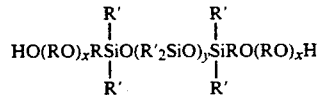

wherein
  x denotes an integer between 0 and 50,
  y denotes an integer between 5 and 500,
  R represents a straight chain or branched $C_2$–$C_{20}$-alkylene group and
  R' represents an optionally branched or substituted $C_1$–$C_{20}$-alkyl group or an optionally substituted aryl group.

Polysiloxanes of the general formula (I) and (II) are known. Their preparation is described in W. Noll, "Chemie und Technologie der Silicone" [The Chemis- When carrying out the process according to the invention, the amount of component a) (polyisocyanate component) is chosen to provide an isocyanate index of about 70 to 130, preferably about 90 to 110, for the foamable mixture. The isocyanate index is the quotient of the number of isocyanate groups divided by the number of isocyanate-reactive groups, multiplied by 100.

In the process according to the invention, the starting materials are preferably reacted with one another in one step in closed molds which may be either metal or plastic molds. Two reaction components are generally used in this process, the polyisocyanate component a) being the first and the component containing isocyanate-reactive groups, i.e. component b) optionally blended with component c), being the second reaction component. Component d) which may optionally be used is generally admixed with component b), but it may also be expedient, for example when using isocyanate group-containing release agents, to mix them with component a) before carrying out the process according to the invention. It is of course in principle also possible to use mixheads, which allow three or four separate components to be used when carrying out the process according to the invention, so that premixing of the individual components is not necessary.

It is also possible when carrying out the process according to the invention to prepare an NCO prepolymer from component a) and a portion of component b) and/or c), and to react this prepolymer in a second reaction step with the remainder of component b) and/or c). However, a two-step procedure of this type is less preferred.

The amount of optionally foamable mixture introduced into the mold is generally such that the molding has a density of about 0.1 to 1.4 g/cm³, preferably about 0.1 to 0.8 g/cm³, more preferably about 0.2 to 0.6 g/cm³. When mineral fillers are also used, moldings having a density greater than 1.0 g/cm³ can be produced. The moldings, which generally have a homogeneous, substantially flaw-free surface, can be released from the mold after a mold dwell time of about 5 to 600, preferably about 10 to 360 seconds. The initial temperature of the mixture introduced into the mold is generally chosen to be a temperature of about 10° to 60° C., preferably about 20° to 50° C. The temperature of the mold is generally about 40° to 140° C., preferably about 50° to 100° C. and more preferably about 50° to 70° C.

Whether foams having an impermeable outer skin (i.e. moldings having a crude density of less than 0.6 g/cm³) or microcellular moldings (i.e. those having a crude density of greater than 0.6 g/cm³) are produced in the process according to the invention depends upon the amount of blowing agents used and the amount of the reaction mixture introduced into the mold. The crude density of the moldings can thus be set by suitably varying these variables. Details on processing equipment which is also suitable according to the invention are described in Kunststoff-Handbuch[Plastics Handbook], Volume VII, published by Vieweg and Hochtlen, Carl-Hanser-Verlag, Munich 1966, for example on pages 121 to 205.

Depending upon the choice of starting compounds and their mixing ratios, the process according to the invention is suitable for the production of hard microcellular moldings or for the production of soft to hard integral molded materials.

The type and mixing ratios of the starting compounds and the amount of the reaction mixture introduced into the mold are preferably selected so that cellular molded polyurethane plastics having a solid surface, a crude density of about 0.2 to 0.6 g/cm³ and a Shore A hardness in accordance with DIN 53 505 of about 40 to 70 are produced. Polyurethane plastics of this type are particularly valuable raw materials for shoe soles. The shoe soles according to the invention may be obtained, for example, by cutting them out of a sheet-form molded plastic according to the invention. However, the shoe soles are preferably obtained using molds corresponding to the shoe soles. A particular preferred embodiment is based on injecting the shoe sole directly onto the shoe upper. In this case the shoe upper represents the upper portion of the shoe sole mold.

In the following examples, all percentages are percent by weight and all amounts in "parts" relate to parts by weight.

EXAMPLES

Example 1

Recipe
Polyol component
74 parts of a polyether diol having an OH number of 28 and prepared by the propoxylation of propylene glycol and subsequent ethoxylation of the propoxylation product (PE:EO weight ratio=80:20):
10 parts of a polyether triol having an OH number of 35 and prepared by the propoxylation of trimethylolpropane and subsequent ethoxylation of the propoxylation product (PO:EO weight ratio=87:13)
7 parts of 1,4-butanediol
0.5 parts of ethylene glycol
6 parts of trichlorofluoromethane
0.5 parts of triethylenediamine
0.02 parts of dibutyltin dilaurate
0.1 part of water
2 parts of trichlorotrifluoroethane

| Polysiloxane of formula 1 | Ex. 1a (comp.) | Ex. 1b (accor. to the inven.) | Ex. 1c (accor to the inven.) |
|---|---|---|---|
| Polysiloxane I (parts) | | 2 | 4 |

Isocyanate component
41 parts of an NCO semi-prepolymer having an NCO content of 23%, prepared by reacting diphenylmethane 4,4'-diisocyanate with tripropylene glycol.

The polyol and isocyanate component were vigorously stirred together by machine at room temperature, transferred into a hinged aluminium mold having a mold cavity measuring 20×20×1 cm (mold temperature 60° C.) and removed from the mold after 5 minutes. The inner walls of the mold had previously been coated with a commercially available external release agent (P 180 from Messrs Acmos, Bremen).

| | Data: | | |
|---|---|---|---|
| | Ia | Ib | Ic |
| Density (kg/m³) (DIN 53420) | 500 | 500 | 500 |
| Shore A hardness (DIN 53 505) | 55 | 55 | 55 |
| Wear (kg) (DIN 53 516) | 303 | 48 | 32 |

Example 2

Recipe
Polyol component
79 parts of a polyether diol having an OH number of 28 and prepared by the propoxylation of propylene glycol and subsequent ethoxylation of the propoxylation product (PO:EO weight ratio=70:30):
10 parts of a polyether triol having an OH number of 35 and prepared by the propoxylation of trimethylolpropane and subsequent ethoxylation of the propoxylation product (PO:EO weight ratio=87:13):
8.5 parts of 1,4-butanediol
0.5 parts of ethylene glycol
5.5 parts of trichlorofluoromethane
0.5 parts of triethylenediamine
0.02 parts of dibutyltin dilaurate
0.18 parts of water
0.2 parts of triethanolamine

| Polysiloxane Formula II | Ex. 2a (comp.) | Ex. 2b (accor. to the inven.) | Ex. 2c (accor. to the inven.) |
|---|---|---|---|
| Polysiloxane II (parts) | | 2 | 4 |

Isocyanate component: 45 parts of the semi-prepolymer set forth in Example 1

| | Data: | | |
|---|---|---|---|
| | Ex. 2a (comp.) | Ex. 2b (accor. to the inven.) | Ex. 2c (accor. to the inven.) |
| Density (kg/m³) | 550 | 550 | 550 |

-continued

|  | Ex. 2a (comp.) | Ex. 2b (accor. to the inven.) | Ex. 2c (accor. to the inven.) |
|---|---|---|---|
| (DIN 53 420) |  |  |  |
| Shore A hardness (DIN 53 505) | 50 | 50 | 50 |
| Wear (mg) (DIN 53 516) | 424 | 91 | 71 |

Example 3

Recipe
Polyol component
70 parts of a polyether diol having an OH number of 28 and prepared by the propoxylation of propylene gylcol and subsequent ethoxylation of propoxylation product (PO:EO weight ratio=80:20)
12 parts of a polyether triol having an OH number of 35 and prepared by propoxylation of trimethylolpropane and subsequent ethoxylation of the propoxylation product (PO:EO weight ratio=87:13)
10 parts of 1,4-butanediol
0.5 parts of ethylene glycol
6 parts of trichlorofluoromethane
0.5 parts of triethylenediamine
0.02 parts of dibutyltin dilaurate
0.15 parts of water

|  | Ex. 3a (comp.) | Ex. 3b (accor. to the inven. | Ex. 3c (accor. to the inven. |
|---|---|---|---|
| Polysiloxane Formula III |  |  |  |
| Polysiloxane III (parts) |  | 2 | 4 |

Isocyanate component: 56 parts of the NCO semi-prepolymer set forth in Example 1

|  | Data: | | |
|---|---|---|---|
|  | 3a | 3b | 3c |
| Density (kg/m$^3$) (DIN 53 420) | 530 | 530 | 530 |
| Shore A hardness (DIN 53 505) | 64 | 63 | 62 |
| Wear (mg) (DIN 53 516) | 129 | 42 | 32 |

Example 4

Recipe
Polyol component
62 parts of a polyether diol having an OH number of 28 and prepared by the propoxylation of propylene glycol and subsequent ethoxylation of the propoxylation product (PO:EO weight ratio=80:20)
24 parts of a polyether triol having an OH number of 35 and prepared by the propoxylation of trimethylolpropane and subsequent ethoxylation of the propoxylation product (PO:EO weight ratio=87:13)
7 parts of 1,4-butanediol
0.5 parts of ethylene glycol
6.5 parts of trichlorofluoromethane
0.5 parts of triethylenediamine
0.02 parts of dibutyltin dilaurate
0.18 parts of water

|  | Ex. 4a (comp.) | Ex. 4b (accor. to the inven.) | Ex. 4c (accor. to the inven.) |
|---|---|---|---|
| Polysiloxane Formula IV 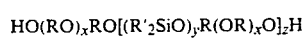 |  |  |  |
| Polysiloxane IV (parts) |  | 2 | 4 |

Isocyanate component: 43 parts of the NCO semi-prepolymer set forth in Example 1

|  | Data: | | |
|---|---|---|---|
|  | 4a | 4b | 4c |
| Density (kg/m$^3$) (DIN 53 420) | 530 | 530 | 530 |
| Shore A hardness (DIN 53 505) | 65 | 64 | 63 |
| Wear (mg) (DIN 53 516) | 121 | 77 | 53 |

Although the invention has been described in detail in the foregoing for the purpose of illustration it is to be understood that such detail is solely for that purpose and that variations can be made therein by those skilled in the art without departing from the spirit and scope of the invention except as it may be limited by the claims.

What is claimed is:

1. An cellular molded polyurethane plastic having a density of about 200 to 800 kg/m$^3$ and a solid surface, characterized by a content of about 0.5 to 4.0% by weight, based on said polyurethane plastic, of a polysiloxane chemically incorporated into the polyurethane structure, wherein said polysiloxane corresponds to the formula $$HO(RO)_xRO[(R'_2SiO)_yR(OR)_xO]_zH$$

wherein
x denotes an integer between 0 and 50,
y denotes an integer between 5 and 500,
z denotes an integer between 1 and 10,
R represents a straight chain or branched C$_2$–C$_{20}$-alkylene group, and
R' represents an optionally branched or substituted C$_1$–C$_{20}$-alkyl group or and optionally substituted aryl group.

2. The polyurethane plastic of claim 1 wherein said polyurethane plastic is a shoe sole.

3. A process for the production of a cellular molded polyurethane plastic having a density of 200 to 800 kg/m$^3$ and a solid surface, which comprises reacting in a closed mold a reaction mixture comprising
a) a polyisocyanate component,
b) a component containing at least one organic compound having at least two isocyanate-reactive groups and a molecular weight of 400 to about 20,000 and
c) optionally a compound having at least two isocyanate-reactive groups and a molecular weight of 18 to 399, wherein portion of component b) and/or c) comprises at least one polysiloxane containing at least two isocyanate-reactive groups, and which corresponds to the formula $$HO(RO)_xRO[R'_2SiO)_yR(OR)_xO]zH$$ 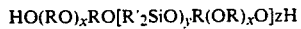

wherein
x denotes an integer between 0 and 50, y denotes an integer between 5 and 500,
z denotes an integer between 1 and 10,
R represents a straight chain or branched $C_2-C_{20}$-alkylene group, and
R' represents an optionally branched or substituted $C_1-C_{20}$-alkyl group or an optionally substituted aryl group;

in an amount of about 0.5 to 4.0% by weight, based on the weight of said polyurethane plastic.

* * * * *